United States Patent Office 3,435,672
Patented Apr. 1, 1969

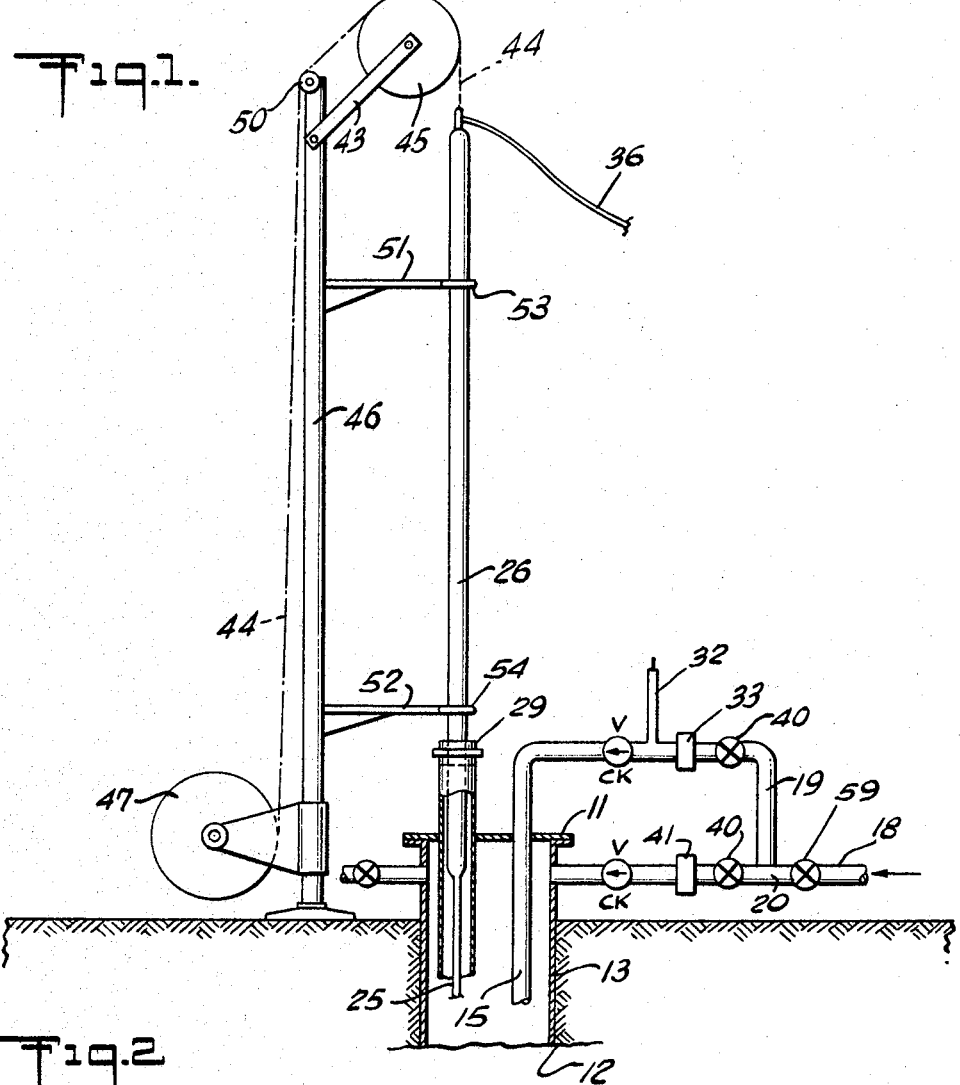
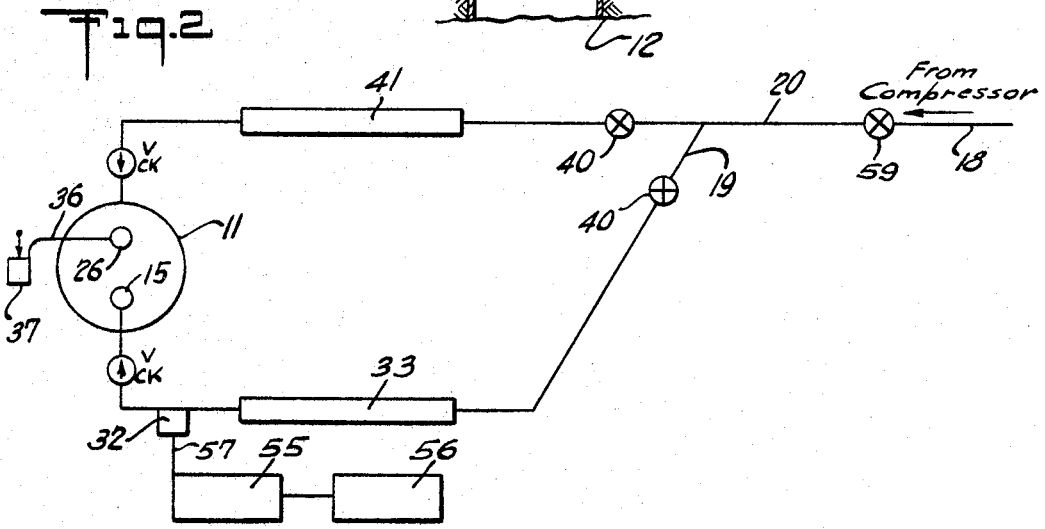

3,435,672
GAS INJECTIVITY OR PRODUCTIVITY
PROFILE LOGGING
Karl C. ten Brink and Charles D. Woodward, Houston, Tex., assignors to Texaco Inc., New York, N.Y., a corporation of Delaware
Filed July 22, 1965, Ser. No. 474,092
Int. Cl. E21b 47/00
U.S. Cl. 73—155                                  3 Claims

ABSTRACT OF THE DISCLOSURE

Gas stream well logging that divides the flow, either into or out of the formation surrounding a well, into two streams and measures the interface location under various flow conditions. A gas containing a halogen is used as a tracer to identify one stream.

---

This invention concerns gas type logging, in general, and particularly relates to that type of borehole logging generally known as injectivity or productivity logging. In that type of borehole logging, various types of information may be obtained. While both liquid and gas logging for either productivity or injectivity types may be employed for various reasons and they both have similarities in the procedures carried out, this invention is particularly applicable to gas logging only.

With respect to so-called injectivity or productivity borehole logging, the procedure involves dividing the flow of fluid in a borehole into two streams. This may be done in various ways but ordinarily involves use of a pipe or conduit that is inserted into the borehole so that the flowing fluids are divided between one stream flowing within such pipe and the other outside thereof, i.e., in the annulus of the borehole surrounding the pipe. In productivity logging, the fluids flow from the borehole and are removed at the surface from the two streams, just mentioned, while in injectivity logging the streams of fluid flowing in the borehole are created by a reverse flow situation in that fluid is pumped into the borehole from the surface, both down the pipe for one stream and down the annulus of the borehole for the other stream. An illustration of both injectivity and productivity logging, using liquids, is the disclosure of U.S. Patent No. 2,947,869, Egan et al., issued Aug. 2, 1960.

In connection with the foregoing type of logging generally, it has been the most widespread practice to employ as a tracer material for one of the streams some convenient radioactive material. Then the determination (under various predetermined conditions) of the location of the interface between the two streams, may be made by determining the amplitude of radioactivity as measured across the interface. In this manner, the difference in amplitude and the location thereof in the borehole will indicate the location of the interface. An illustration of injectivity logging employing gas and radioactive tracer material is the U.S. Patent No. 3,010,023, Egan et al., issued Nov. 21, 1961.

It has been found that such use of radioactive tracer materials involves difficulties in handling to insure safety of personnel, in addition to the relatively high cost of the radioactive material itself. Furthermore, while other tracer materials have been broadly suggested, none have been found to be particularly attractive in practice.

Consequently, it is an object of this invention to provide the improvement in connection with gas injectivity or productivity logging, relating to a new use of a known material as it concerns a tracer material. Thus, it has been discovered that a halogen-containing tracer material may be employed.

Another object of the invention is to teach the particular improvement relating to gas type logging, of the use of Freon gas as the tracer material.

Briefly, the invention is concerned with a method that relates to injectivity or productivity logging applicable to a borehole. The method comprises the steps of dividing said gas into two streams having an interface therebetween downhole, and tagging one of said streams with a tracer material. The method also comprises detecting the presence or absence of said tracer material across said interface in order to measure the location of the interface. In connection with a method as set forth above, the invention particularly relates to the improvement that comprises the step of employing a halogen containing gas as the tracer material.

Other objects and benefits of the invention will be more fully set forth below in connection with the best mode contemplated by the inventors of carrying out the invention, and in connection with which there are illustrations provided in the drawings, wherein:

FIGURE 1 is a diagram schematically illustrating one type of apparatus that may be employed in connection with an injectivity logging procedure, as it is carried out in accordance with the invention; and FIGURE 2 is a schematic diagram illustrating the manifold or piping arrangements that are employed with the apparatus according to FIGURE 1.

As pointed out above, the invention concerns a gas type of so-called injectivity or productivity logging. The drawings illustrate one type of apparatus that has been employed in carrying out a gas injectivity profile log. Thus, the basic procedure is similar to that described in the above mentioned Egan et al. Patent No. 3,010,023.

In the present application, FIGURE 1 illustrates schematically the equipment that has been employed in carrying out a particular gas injectivity profile logging operation. It will be observed that there is a casing head 11 which is shown schematically as being an integral part of a casing 13 that extends out the top of a borehole 12. Also, there is a string of tubing 15 that extends through the casing head 11 and downhole near the bottom thereof, or at least below the formation of interest that is to be logged. Air that is to be injected into the formation is introduced over a "line" or pipe 18, which leads from the output of a compressor (not shown). The air stream thus created is divided into two streams by providing the pipe connections illustrated, i.e., by having pipes 19 and 20 joined in common to the pipe 18. In this manner, one stream of air is directed through pipe 19 to the upper end of the tubing string 15. It flows down through the tubing string while another stream is directed through pipe 20 and is connected to the inside of the casing 13 adjacent to the casing head 11. The latter stream of air flows downhole in the annulus surrounding tubing string 15.

The foregoing two streams both flow into the formation downhole, and of necessity they form an interface therebetween. The location of the interface thus formed, coupled with metering of the flow of the separated streams will provide data from which a log or profile of relative formation permeability may be constructed.

The location of the interface between the two streams may be determined by employing equipment such as that illustrated. There is included a small diameter pipe string 25 which extends downhole to the formation of interest and is attached to a joint or section of larger diameter pipe 26 that may be moved vertically a sufficient distance to cover the zone of interest from one end to the other. This vertical movement is accomplished, relative to the casing head 11, by employing a stuffing box 29 through which the pipe joint 26 may be moved while the gas pressure within the casing 13 is kept sealed therein. In this manner the open end of the small diameter pipe string 25, is movable vertically over the extent of the formation of interest so that the location of the interface may be followed over the entire range of possible location thereof.

It is to be noted that one of the streams (in this case, the stream flowing through tubing 15) is tagged with a tracer material so that it may be distinguished from the other stream that is also being pumped downhole. In accordance with this invention, the tagging material may be any convenient halogen. In this instance, it is preferably Freon gas. The term "Freon" is a registered trademark in the name of E. I. du Pont de Nemours and Company. However, at least one dictionary defines it as "an odorless, colorless gas, $CCl_2F_2$, boiling at $-29°$ C., used as a refrigerating agent." Such Freon gas is introduced through a pipe joint 32 that is connected into the pipe 19 on the side toward tubing string 15 of a flow meter 33 that is located in the pipe line 19.

By thus tagging with a tracer material only one of the two streams, the interface may be located downhole by sampling and determining whether the tagging material is present or not. The location of the interface is measured by moving the open end of the pipe string 25 vertically over the extent of the formation where both streams are being injected, while withdrawing a small amount of gas. The withdrawal takes place through both the pipe string 25 and pipe joint 26, at the top thereof, as well as through a flexible hose 36 at the end of which is located a halogen detector 37 (FIGURE 2).

In order to cause the interface to move from one end of the formation to the other, the relative rate of flow of each of the two streams is adjusted while maintaining the sum of the rates constant. This may be accomplished, for example, by regulating a plurality of valves 40 that are connected in the manifolded system that is illustrated in the schematic showing of FIGURE 2.

As is more fully explained in the above mentioned Patent No. 3,010,023, the logging to determine permeability characteristics of the formation, is carried out by regulating the relative amount of air flow in the two streams. The rates of flow are measured individually, by the flow meter 33 in the stream flowing through tubing 15 and also by a flow meter 41 in the pipe 20 which leads to the interior of the casing. Then, in order to determine the amount of fluid that is entering into a vertical increment of the formation of interest, the rates of injection or flow of each of the two streams are varied in percentage of the total flow from 0 to 100. Under each given flow condition the interface will tend to be located at a given position depending upon the conditions of the formation downhole, so that a record or log of the position thereof taken together with the rates of flow in the two streams will provide a flow log which records the desired information, in the manner described in the aforementioned patents.

It will be observed that the machanics of adjusting the vertical position of the probe, i.e., the open end of pipe string 25, may be carried out in any feasible manner. One arrangement for making such vertical position adjustments is that illustrated. Thus, the upper end of the pipe joint 26 is supported by having a logging cable 44 attached thereto. Cable 44 may be adjusted for moving the pipe joint 26 (and attached pipe string 25) vertically. A pulley 45 is supported on an A frame 43, or the like, that is attached near the top of a mast or frame structure 46 which has a winch 47 supported thereon near the base thereof. Winch 47 acts to pull in or let out the cable 44 so as to cause vertical adjustments of the probe.

It will be observed that there is a small guide pulley 50 near the top of the mast, and there are a pair of rod guides 51 and 52 that extend out horizontally from the mast 46. These guides each have a ring 53 and 54 respectively at the extremity thereof which surrounds the pipe joint 26 and acts as a guide therefor.

With reference to FIGURE 2, it is pointed out that a preferred arrangement for introducing the tracer material is that indicated schematically. There is a Freon container 55 which has a cylinder of nitrogen 56 connected thereto for driving some of the Freon out over a piping connection 57 (indicated schematically) from the Freon container 55 to the pipe joint 32, where it is mixed with the air flow of that one of the streams flowing in pipe 19, and thereafter into the tubing 15.

It is to be particularly noted that the detection of the presence or absence of a halogen containing gas is a very simple matter. It merely involves whatever equipment (schematically shown in FIGURE 2 at reference numeral 37) is needed to be able to apply a flame test to the small quantity of gas that is being withdrawn through the probe via the flexible hose 36. Such flame test for halogen presence is of course old and well known, per se. For example, see volume II of the book entitled "The Science and Engineering of Nuclear Power" by Fontaine C. Armistead, et al. at page 48 thereof, published in 1949 by Addison-Wesley Press, Inc. and edited by Clark Goodman.

Thus, the characteristic color revealed in a flame test will show the presence of a halogen and will make determination of whether or not the tracer material is present a very simple matter. It is especially to be noted that this greatly simplified procedure for determining the tracer material presence is a great saving in expense, and in handling problems over former methods particularly where radioactive material was employed as the tracer.

It may be noted that there is a valve 59 which may be employed to regulate the amount of total flow that is divided between the two streams. Depending upon the circumstances this valve might be operated wide open or partly shut, and of course the system may be shut off at this point when not in use.

It will be appreciated that while the particular embodiment set forth above relates to injectivity gas type logging, the principle of this invention is equally applicable to gas logging of the productivity type. For example, see that type of gas logging set forth and described in a copending application Ser. No. 372,135, filed May 22, 1964, inventor K. C. ten Brink, now U.S. Patent 3,345,868. In that case the physical structure is in effect reversed, on account of its being productivity logging, and the tracer material is introduced through a small diameter pipe having its open end downhole adjacent to the opening of the tubing which has the flow of one of the two streams therein. The tracer detector is connected to one of the streams at the surface, and may act in the manner described above if the method according to this invention is employed. In such case the detector will be a halogen type and the tracer material will be a halogen containing gas.

In other words, instead of sampling the gas of one of the streams downhole and then detecting whether tracer is present for finding the injectivity interface location, the reverse situation exists for productivity, which is that of introducing the tracer material downhole and then sampling and detecting presence or absence of tracer at the surface in one of the two streams. In any event the benefits according to this invention may be had for a productivity logging procedure similarly as is the case with relation to an injectivity logging procedure such as has been described above in this application.

It will be appreciated by anyone skilled in the art that the tracer material, which has been described generally as a halogen containing gas, may take the form of chlorine or any of a number of gaseous halo hydrocarbons having desired properties for the conditions that will be encountered. For example, the following might be employed: methyl chloride, ethyl chloride, methyl bromide or ethyl fluoride. Furthermore, the preferred tracer may be any appropriate one of the series of Freons which fall within the definition "a fluorinated hydrocarbon," e.g., difluorodichloromethane.

While preferred embodiments according to this invention have been described above in considerable detail in accordance with the applicable statutes, this is not to be taken as in any way limiting the invention, but merely as being descriptive thereof.

We claim:
1. A gas injectivity logging method applicable to a borehole, comprising the steps of:
   dividing said gas into two streams having an interface therebetween downhole,
   tagging one of said streams at the surface with a tracer material,
   sampling said gas downhole, and
   detecting the presence or absence of said tracer material while noting the location of said sampling in order to measure the location of the interface.
2. A gas injectivity logging method according to claim 1 wherein a halogen is employed as said tracer material.
3. A gas injectivity logging method according to claim 2 wherein said step of sampling comprises drawing off a small amount of said gas from downhole to the surface.

References Cited

UNITED STATES PATENTS

| | | | |
|---|---|---|---|
| 2,336,612 | 12/1943 | Horvitz. | |
| 2,700,734 | 1/1955 | Egan et al. | 73—155 X |
| 2,947,869 | 8/1960 | Egan et al. | |
| 2,993,119 | 7/1961 | McKay | 73—155 X |
| 3,010,023 | 11/1961 | Egan et al. | |
| 3,077,104 | 2/1963 | Fowler | 73—40.7 X |
| 3,123,708 | 3/1964 | Limanek | 73—155 X |

RICHARD C. QUEISSER, *Primary Examiner.*

J. W. MYRACLE, *Assistant Examiner.*

U.S. Cl. X.R.

23—230